(12) United States Patent
Flaherty

(10) Patent No.: US 8,235,034 B1
(45) Date of Patent: Aug. 7, 2012

(54) SYSTEMS MOVING AIR THROUGH A CONDUIT WITHIN A SOLAR HEAT COLLECTOR HAVING OVERTEMPERATURE PROTECTION

(76) Inventor: B. Michael Flaherty, Stuart, FL (US)

( * ) Notice: Subject to any disclaimer, the term of this patent is extended or adjusted under 35 U.S.C. 154(b) by 0 days.

(21) Appl. No.: 12/804,722

(22) Filed: Jul. 28, 2010

(51) Int. Cl.
*F24J 2/40* (2006.01)
*F24J 2/42* (2006.01)
*F24J 2/24* (2006.01)
*B01D 47/02* (2006.01)
*B60K 16/00* (2006.01)

(52) U.S. Cl. ........ 126/589; 126/564; 126/583; 126/585; 126/599; 126/651; 126/572; 261/121.1; 60/641.8

(58) Field of Classification Search .................. 126/564, 126/627, 568, 651, 638, 589, 599, 585, 583, 126/572; 261/121.1, 121.2, 121.3; 60/641.8; 137/67

See application file for complete search history.

(56) References Cited

U.S. PATENT DOCUMENTS

| | | | |
|---|---|---|---|
| 4,043,317 A | 8/1977 | Scharfman | |
| 4,150,659 A | 4/1979 | Buckley | |
| 4,153,040 A | 5/1979 | Harrison et al. | |
| 4,219,009 A | 8/1980 | Palmer | |
| 4,226,225 A | 10/1980 | Niedermeyer | |
| 4,289,118 A * | 9/1981 | Stark | 126/577 |
| 4,305,383 A * | 12/1981 | Bloxsom | 126/643 |
| 4,396,004 A | 8/1983 | Koenig | |
| 4,399,807 A | 8/1983 | Buckley et al. | |
| 4,429,545 A | 2/1984 | Steinberg | |
| 4,437,511 A * | 3/1984 | Sheridan | 165/48.2 |
| 4,644,935 A * | 2/1987 | Gallagher | 126/588 |
| 4,899,401 A * | 2/1990 | Savarese | 4/541.5 |
| 5,014,770 A * | 5/1991 | Palmer | 165/48.2 |
| 5,035,200 A * | 7/1991 | Moriyama et al. | 118/693 |
| 5,124,088 A * | 6/1992 | Stumphauzer | 261/121.1 |
| 6,202,991 B1 * | 3/2001 | Coniglio et al. | 261/121.1 |
| 6,962,150 B2 * | 11/2005 | Booth | 126/563 |
| 7,870,855 B2 * | 1/2011 | Flaherty | 126/651 |
| 2002/0117166 A1 * | 8/2002 | Okumura | 126/633 |

FOREIGN PATENT DOCUMENTS

WO   WO 2005/003643 A1   1/2005

* cited by examiner

*Primary Examiner* — Kenneth Rinehart
*Assistant Examiner* — William Corboy
(74) *Attorney, Agent, or Firm* — Norman Friedland; Ronald Davidge

(57) ABSTRACT

A system including a solar heat collector and a heat receiving structure has a supply conduit extending through an airspace within the solar heat collector, to the heat receiving structure, and into the heat receiving structure. A temperature sensor within the airspace of the solar heat collector measures a temperature within the airspace of the solar heat collector and turns an air pump on to move air through the supply conduit it this temperature is too high. This air may be exhausted through a bypass valve instead of being pumped into the heat receiving structure. The heat receiving structure may include a pool with water heated by bubbles of hot air from the supply conduit.

11 Claims, 9 Drawing Sheets

| | | | PUMP | IVALVE | BVALVE | |
|---|---|---|---|---|---|---|
| COT | $\overline{AUT}$ | ROT | 1 | 1 | 1 | 82 |
| | | $\overline{(ROT \cdot RUT)}$ | 1 | 0 | 1 | 84 |
| | | RUT | 1 | 0 | 0 | 80 |
| | AUT | ROT | 1 | 1 | 1 | 82a |
| | | $\overline{(ROT \cdot RUT)}$ | 1 | 0 | 0 | 83 |
| | | RUT | 1 | 0 | 0 | 80 |
| $\overline{COT}$ | $\overline{AUT}$ | ROT | 0 | 0 | 0 | 81 |
| | | $\overline{(ROT \cdot RUT)}$ | 0 | 0 | 0 | 81 |
| | | RUT | 1 | 0 | 0 | 80 |
| | AUT | ROT | 0 | 0 | 0 | 81 |
| | | $\overline{(ROT \cdot RUT)}$ | 0 | 0 | 0 | 81 |
| | | RUT | 1 | 0 | 0 | 80 |

SYSTEMS MOVING AIR THROUGH A CONDUIT WITHIN A SOLAR HEAT COLLECTOR HAVING OVERTEMPERATURE PROTECTION

RELATED APPLICATIONS

Not Applicable

FEDERALLY SPONSORED RESEARCH OR DEVELOPMENT

Not Applicable

BACKGROUND OF THE INVENTION

1. Field of the Invention

This application relates to systems including solar heat collectors, and, more particularly to such systems including conduits extending through airspaces within the solar heat collectors with air being heated as it is pumped through the conduits, and yet more particularly such systems in which air from the conduits is used to heat water within a pool, and additionally to such systems in which over-temperature protection is provided.

2. Summary of the Background Art

Conventional solar heating systems for heating pools or hot tubs circulate water from the pool through a solar heat collector. Systems of this kind are known to have disadvantages arising from the fact that pool water is circulated through the entire system, making it difficult to select materials for the components of the system. For example, if copper is used, the pool water is turned green. Furthermore, the solar heat collector of such a system is typically a structure placed on the roof of a house, with the structure having approximately the area of the pool being heated, and with the structure being comprised of a black plastic material that is susceptible to degradation from ultraviolet light and additionally to hurricane damage. Thus, what is needed is a solar heating system in which water from a pool is not circulated through the solar heat collector, preferably with the solar heat collector being located within a separate structure, not necessarily on the roof of a building.

Since heat is added to a solar heat collector at a rate generally dependent on weather conditions and removed from the heat collector at another rate, which is generally dependent on the rate at which the heat is used for various purposes, the solar heat collector itself is subject to overheating. It is therefore desirable to provide over-temperature protection for the airspace within a solar heat collector. A particular benefit of such protection arises from the fact that a solar heat collector having effective over-temperature protection can include materials that would be damaged without over-temperature protection.

The patent literature describes solar heat collectors including an air chamber between a glazed outer surface and a heat absorber through which a working fluid flows to provide heat to another area. The air chamber has openings at each end for receiving air from the atmosphere and for venting air into the atmosphere. To heat the heat absorber, an opening at least at the upper end of the air chamber is closed. When the heat absorber reaches a predetermined maximum temperature, the opening at the upper end or the openings at both ends are opened, so that outside air flows through the air chamber. The patent literature additionally describes an air flow type of solar collector including an air chamber through which air from a structure is circulated. The air chamber also includes openings to outside air at a lower end and at an upper end, both of which can be individually sealed by inflating a flexible tube, allowing different modes of operation under summer and winter conditions. The patent literature further describes water heating solar systems in which water from another source, such as tap water, is added to the water being heated when it is determined to be too hot.

SUMMARY OF THE INVENTION

In accordance with the invention, a system is provided, including a solar heat collector, a heat receiving structure, a supply conduit, an air pump, and a control circuit. The solar heat collector includes a partly translucent structure surrounding an airspace. The supply conduit forms an air path extending through the airspace within the solar heat collector, between the solar heat collector and the heat receiving structure, and into the heat receiving structure.

In accordance with one aspect of the invention, the system additionally includes a first temperature sensor, producing a collector over temperature signal when a temperature within the airspace, external to the supply conduit, exceeds a predetermined level. The control circuit turns the air pump on in response to the collector over temperature signal, so that the air pump blows air through the supply conduit. In this way, the air pump is turned on to cool the solar heat collector by moving air through the supply conduit so that heat within the airspace does not damage temperature-sensitive structures within the solar heat collector.

In accordance with another aspect of the invention, the heat receiving structure includes a pool, which is heated by the air pump blowing air through the supply conduit to form bubbles of heated air within water in the heat receiving structure. At least a part of the water within the heat receiving structure is within the pool, which is, for example, formed as a hot tub or a swimming pool. Heated air from the supply conduit may be blown directly into the pool, or into an enclosed tank, from which water is circulated into the pool.

Preferably, the system additionally includes a return conduit, returning air from the heat receiving structure to the supply conduit within the solar heat collector. For example, the air may be returned from an airspace within an enclosing structure enclosing a pool, through which bubbles of heated air rise to be exhausted into the airspace, or from an airspace within an enclosed tank including water through which bubbles of heated air rise. Alternately, the heat receiving structure may include an enclosing structure, such as a house or cabin, enclosing an airspace, with a duct, including a number of outlets, extending from the supply conduit into the airspace, and with the return conduit being connected to the airspace.

Preferably, the system additionally includes a bypass valve within the supply conduit between the solar heat collector and the heat receiving structure, with the control circuit, in response to the collector over temperature signal, additionally moving the bypass valve between a first condition, in which air from the solar heat collector moves through the bypass valve into the heat receiving structure, and a second condition, in which air from the solar heat collector moving through the bypass valve is exhausted into the atmosphere through an exhaust port. The system may additionally include an input valve connecting the return conduit to the supply conduit within the solar heat collector, with the control circuit additionally moving the input valve between a first condition, in which air is drawn into the supply conduit from the return conduit, and a second condition, in which air is drawn into the supply conduit within the solar heat collector from the atmosphere outside the solar heat collector.

Preferably, the system additionally includes a switching circuit having a second temperature sensor producing a receiver under temperature signal as an input to the control circuit in response to measuring a temperature within the heat receiving structure at a level below a predetermined minimum. The control circuit additionally turns the air pump on in response to the receiver under temperature signal. For example, the control circuit may cause the bypass valve to be held in the first condition while receiving the receiver under temperature signal and to be held in the second condition while receiving the collector over temperature signal without the receiver under temperature signal.

The second temperature sensor may additionally produce a receiver over temperature signal as an input to the control circuit in response to measuring a temperature within the heat receiving structure at a level above a predetermined maximum level. The system may additionally comprise a third temperature sensor, measuring an air temperature outside the solar heat collector and outside the heat receiving structure and producing an ambient air under temperature signal when the air temperature is below a predetermined minimum level. The control circuit may additionally cause the bypass valve and the input valve to operate in response to the receiver over temperature signal and the ambient air under temperature signal. The solar heat collector may additionally include a liquid path connected to a water supply, heating water for domestic use, while the heat receiving structure additionally includes at least one heated water receiving structure connected to the liquid path through an outlet water tube. Preferably, an input end of the liquid path within the solar heat collector is connected to the water supply through an anti-scald valve, while an output end of the liquid path is connected to the outlet water tube through the anti-scald valve. The anti-scald valve operates so that, when the temperature of water moving into the outlet water tube is below a predetermined level, all of the water moving into the outlet water tube is from the output end of the liquid path within the solar heat collector, and additionally so that, when the temperature of water moving into the outlet water tube moves above the predetermined level, water from the water source is admitted into the outlet water tube

BRIEF DESCRIPTION OF THE DRAWINGS

These and other aspects of the invention will be made apparent by reviewing the following specification, along with the drawings, in which.

DETAILED DESCRIPTION OF THE INVENTION

Figure 1:
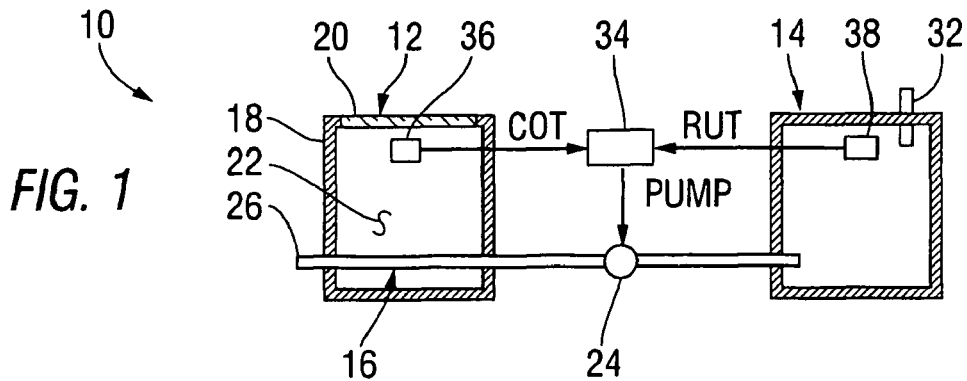
FIG. 1 is a schematic view of a system built in accordance with a first embodiment of the invention.

FIG. 1 is a schematic view of a system 10 built in accordance with a first embodiment of the invention to include a solar heat collector 12, a heat receiving structure 14, and a supply conduit 16 forming an air path extending through the solar heat collector 12 and into the heat receiving structure 14. The solar heat collector 12 includes an enclosing structure 18, having a translucent portion 20, surrounding an airspace 22, which is heated by solar radiation transmitted through the translucent portion 20. Within the solar heat collector 12, the supply conduit 16 may be coiled or otherwise arranged to provide a sufficient surface for receiving heat from the airspace 22. An air pump 24 is provided to move air from an inlet 26 within the supply conduit 16 through the solar heat collector 12. Preferably, the air pump 24 is a fixed displacement device, such as a vane pump or a pump including one or more reciprocating pistons. The heat receiving structure 14 additionally includes a vent 32, allowing air to be pumped into the heat receiving structure 14 through the supply conduit 16 without substantially increasing a pressure within the heat receiving structure 14. A control circuit 34 controls operation of the air pump 24, producing a pump drive signal (PUMP) when the air pump 24 is to be turned on and driven in response to inputs from a temperature sensor 36 in the airspace 22 within the solar heat collector 12 and additionally in response to inputs from a switching circuit 38 within the heat receiving structure 14. The temperature sensor 36 produces a collector over temperature signal (COT) in response to determining that a temperature within the airspace 22 exceeds a predetermined maximum temperature. The switching circuit 38, which produces a receiver under temperature (RUT) signal, may be a temperature sensor, producing a signal calling for heat when a temperature within the heat receiving structure 14 falls below a preset level, a switch operated by an individual within the heat receiving structure 14, indicating a need for heat, or a combination of the two devices, providing for manual or automatic operation.

Figure 2:
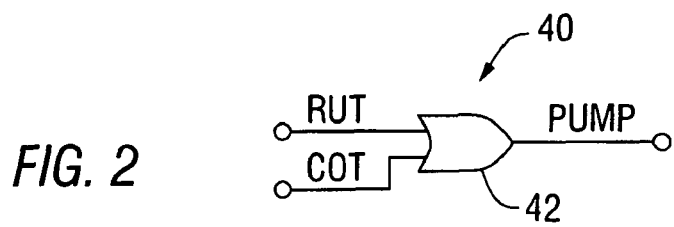
FIG. 2 is a schematic view of a switching circuit within a control circuit of the system of FIG. 1.

FIG. 2 is a schematic view of a switching circuit 40 within the control circuit 34. An OR gate 42 produces the PUMP signal whenever either the COT or RUT signal is turned on, indicating the presence of a signal from either the temperature sensor 36 or the switching circuit 38. Since the air pump 24 is always turned on in response to the RUT signal, the switching circuit 38 can always be used to start and maintain the heating process. Since the air pump 24 is additionally always turned on in response to the COT signal, materials, such as plastics, having service temperatures above the temperature at which this signal is produced can be used within the solar heat collector 12.

Figure 3:
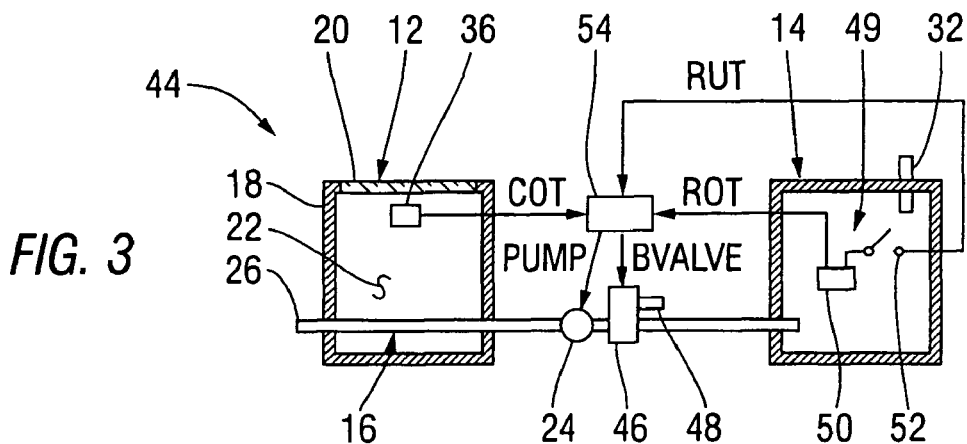
FIG. 3 is a schematic view of a system built in accordance with a second embodiment of the invention.

FIG. 3 is a schematic view of a system 44 built in accordance with a second embodiment of the invention to include a bypass valve 46 within the supply conduit 16 between the solar heat collector 12 and the heat receiving structure 14. The bypass valve 46 is movable between a first condition, in which air from the solar heat collector 12 moves through the bypass valve 46 into the heat receiving structure 14, and a second condition, in which air from the solar heat collector 12 moving through the bypass valve 46 is exhausted into air outside the solar heat collector 12 and outside the heat receiving structure 14 through an exhaust port 48. A switching circuit 49 within the heat receiving structure 14 includes a temperature sensor 50 producing a receiver over temperature signal (ROT) when a measured temperature is above a predetermined maximum level, and additionally producing a signal transmitted to a switch 52 when the measured temperature is below a predetermined minimum. When the switch 52 is closed by an individual turning the heating system on, this signal transmitted to the switch 52 becomes the RUT signal transmitted to a control circuit 54 controlling operation of both the air pump 24 and the bypass valve 46. Other elements are as described above in reference to FIG. 1, and are accorded like reference numbers.

Figure 4:
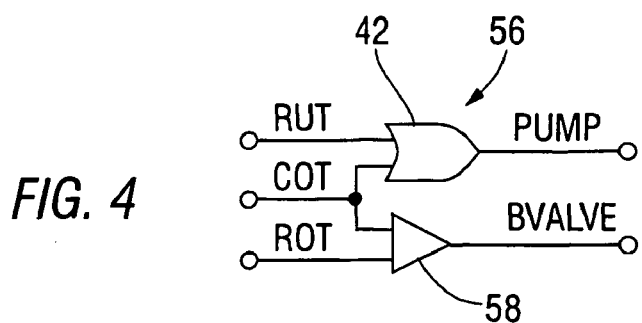
FIG. 4 is a schematic view of a switching circuit within a control circuit of the system of FIG. 3.

FIG. 4 is a schematic view of a switching circuit 56 within the control circuit 54. Again, the OR gate 42 produces the PUMP signal whenever either the COT or RUT signal is turned on. An AND gate 58 produces a BVALVE signal, holding the bypass valve 46 in the second condition to exhaust air from the solar heat collector 12 into the atmosphere through the exhaust outlet 48. Operation of the bypass valve 46 in this way prevents the movement of heated air from the solar heat collecting structure 12 into the heat receiving structure 14 when it is necessary to operate the air pump 24 to cool the solar heat collector 12 with the heat receiving structure 14 at a temperature high enough to cause the ROT signal to be turned on. It is understood that the ROT signal is turned on only when the temperature measured by the temperature sensor 50 is somewhat above the temperature at which the RUT signal is turned on. In a system not generating the ROT signal, the RUT signal may be inverted to be provided as an input to the AND gate 58. In either case, when the RUT signal is present, the BVALVE signal is not produced, so that the bypass valve 46 is held in the first condition, with air from the conduit 16 moving into the heat receiving structure 14.

Figure 5:
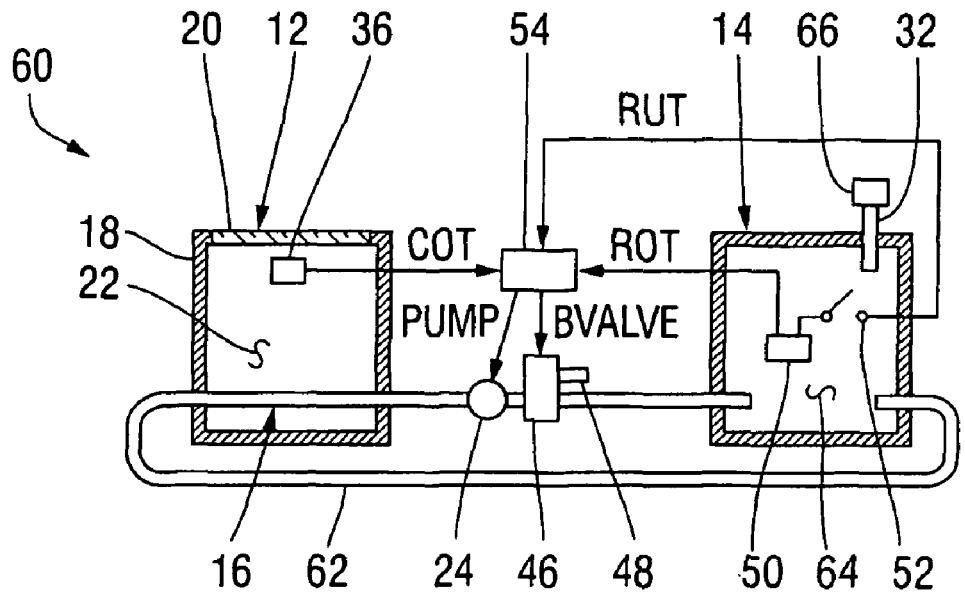
FIG. 5 is a schematic view of a system built in accordance with a third embodiment of the invention.

FIG. 5 is a schematic view of a system 60 built in accordance with a third embodiment of the invention to include a return conduit 62, providing for a continuous circulation of air through the solar heat collector 12 and the heat receiving structure 14, and therefore increasing the capability of the system 60 to efficiently produce and maintain temperatures substantially above the surrounding outdoor temperature. The vent 32 connecting an airspace 64 within the heat receiving structure with the surrounding atmosphere may be provided with a spring-loaded damper 66 that opens to allow a flow or air into the heat receiving structure 14 when the pressure within this structure 14 is lowered below a threshold level by operation of the system 60 with air taken from the airspace 64 being exhausted through the bypass valve 46. Other elements within the system 60 are as described above regarding FIGS. 1-4, and are accorded like reference numbers. For example, the system 60 includes a control circuit 54 operating as described above in reference to FIGS. 3 and 4.

Figure 6:
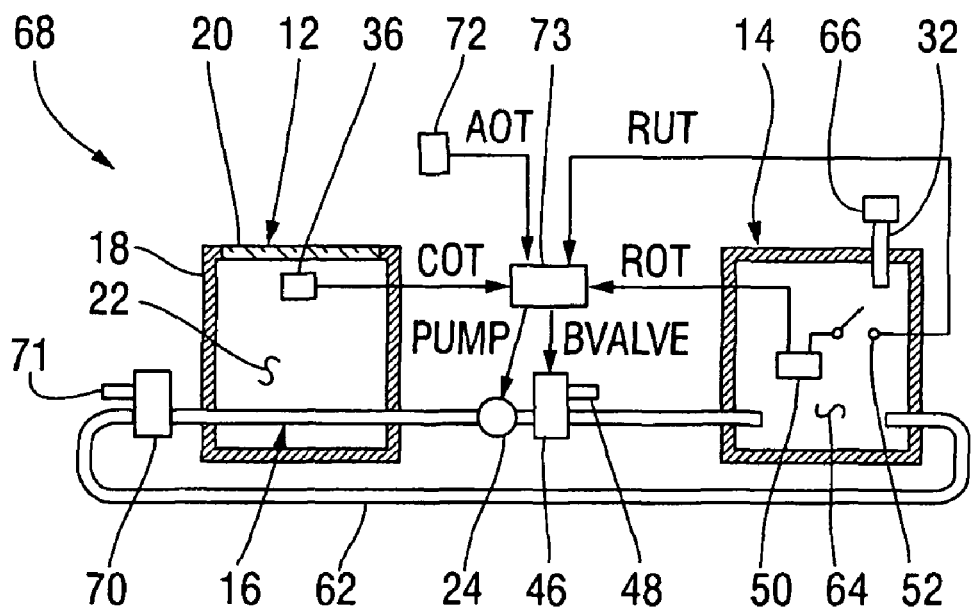
FIG. 6 is a schematic view of a system built in accordance with a fourth embodiment of the invention.

FIG. 6 is a schematic view of a system 68 built in accordance with a fourth embodiment of the invention to include an input valve 70, which is movable between a first condition, in which air is drawn into the supply conduit 16 extending through the solar heat collector 12 from the return conduit 62, and a second condition, in which air is drawn into the supply conduit 16 extending through the solar heat collector 12 from outside air outside the solar heat collector 12 and outside the heat receiving structure 14 through an input line 71. Since this additional input valve 70 makes it possible to operate the system 68 in several ways when it is necessary to cool the solar heat collector 12 in response to a COT signal, provisions are made for determining how the solar heat collector 12 will be cooled as a function of a measured ambient air temperature. Thus, an ambient air temperature sensor 72 is added to produce an ambient under temperature (AUT) signal whenever the ambient air temperature falls below a predetermined minimum level. The ambient air temperature sensor is located outside both the solar heat collector 12 and the heat receiving structure 14. The system 68 includes a control circuit 73, operating in response to the AUT signal, as well as to the previously-described COT, ROT, and RUT, to produce an input valve driving signal (IVALVE) signal in addition to the previously-described PUMP and BVALVE signals. When the IVALVE signal is present, the input valve 70 is operated so that air is drawn through the inlet 71 instead of through the return conduit 62.

Figures 7, 8:
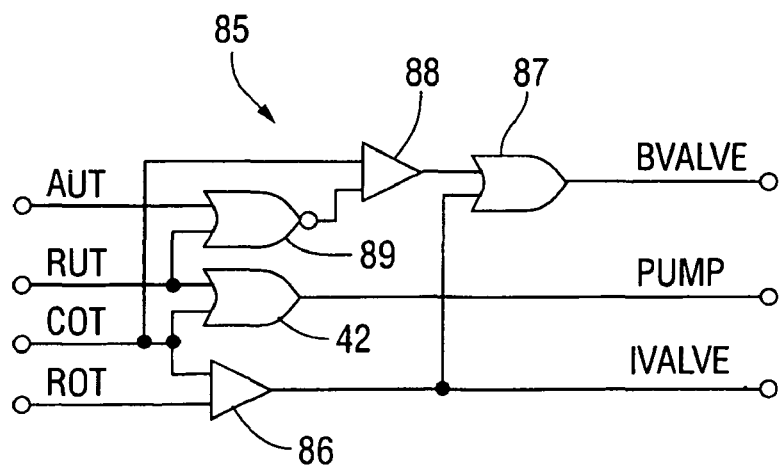
FIG. 7 is a Karnaugh map of logical operations occurring within a control circuit of the system of FIG. 6.
FIG. 8 is a schematic view of a switching circuit within a control circuit of the system of FIG. 6.

FIG. 7 is a Karnaugh map 74 of exemplary logical operations occurring within the control circuit 73 of the system 68 to produce the PUMP, IVALVE, and BVALVE output signals described above as functions of the COT, AOT, and AUT input signals, also described above. Each of the lines 75 within the Karnaugh map 74 describes the each of the output signals as being on, indicated by a "1," or off, indicated by a "0," as a function of the state of each of the input signals. In the first column 76 the COT input signal is indicated as being on by COT, and as being off by COT overscored. In the second column 77, the AUT input signal is indicated as being on by AUT, and a being off by AUT overscored. The third column 78 is arranged to indicate signal levels arising from three separate conditions within the heat receiving structure 14. A need for heat, with the receiver under temperature signal being on, as indicated by RUT, while a measured temperature over a predetermined maximum level is indicated by ROT. An intermediate condition, with neither the receiver under temperature signal nor the receiver over temperature signal being on, is indicated by a Boolean expression 79. It is understood that the temperature at which the ROT signal is turned on is higher than the temperature at which the RUT signal is turned on.

For example, whenever the RUT signal is on, as shown in rows 80 of the Karnaugh map 74, indicating a need for heat within the heat receiving structure 14, the air pump 24 is turned on with the PUMP signal and with neither of the valves 24, 70 being operated by the BVALVE and IVALVE signals, respectively, so that air is circulated through the conduits 16, 62 between the solar heat collector 12 and the heat receiving structure 14, causing the air 64 within the heat receiving structure 14 to be heated while the air 22 within the solar heat collector 12 is cooled. When both the COT signal and the RUT signals are turned off, as shown in rows 81, indicating that there is no need for heating or for cooling, the PUMP, BVALVE, and IVALVE signals are all turned off. When both the COT and the ROT signals are turned on, as shown in rows 82, 82a indicating that there is a need to cool the solar heat collector 12 without heating the heat receiving structure 14, the PUMP, IVALVE, and BVALVE signals are all turned on, so that outside air is brought into the supply conduit 16 extending through the solar heat collector 12, to be heated there, while cooling the air 22 within the solar heat collector 12, and to be then exhausted to the atmosphere without entering the heat receiving structure 14.

The ambient air under temperature signal (AUT) is used, for example, to determine how the system 68 operates when the COT signal is turned on with both the ROT and RUT signals turned off, indicating that there is a need to cool the solar heat collector 12 without a need to heat the heat receiving structure 14, which is still not at a temperature high enough to turn the ROT signal on. When this occurs with the AUT signal being on, as shown in row 83, indicating a cold day, it is assumed that overheating within the solar heat collector 12 has occurred because the day is bright and sunny, but that, since the day is also cold, solar heat will not be available later, when it may be needed. Therefore, the system 68 is operated with the PUMP signal on, but with the IVALVE and BVALVE signals turned off, so that air circulates within the conduits 16, 62 through both the solar heat collector 12, which is cooled, and the heat receiving structure 14, which is heated so that it will not need to be heated as much later.

On the other hand, when the COT signal is turned on with the ROT, RUT, and AUT signals all turned off, as shown in row 84, the IVALVE signal is turned off with the PUMP and BVALVE signals being turned on, so that air is pulled from the heat receiving structure 14 to cool the solar heat collector 12. This air is then exhausted through the bypass valve 46, not being returned to heat the heat receiving structure 14. Outside air is pulled into the heat receiving structure 14 through the spring-loaded valve 66 to replace the air being pulled into the solar heat collector 12 through the return conduit 62.

FIG. 8 is a schematic view of a switching circuit 85 within the control circuit 73 of FIG. 6. As described above in reference to FIG. 4, an OR gate 42 produces the PUMP signal whenever either the COT or RUT signal is turned on. An AND gate 86 produces the IVALVE signal only when the COT and ROT signals are both present, as shown in rows 82, 82a of the Karnaugh map 74. The output of AND gate 86 is additionally directed as an input to an OR gate 87, which produces the BVALVE signal, since this signal is also shown in rows 82, 82a. An AND gate 88, together with a NOR gate 89, produces the BVALVE signal whenever the COT signal is present with the AUT and RUT signals both off, as shown in rows 82 and 84.

Figure 9:
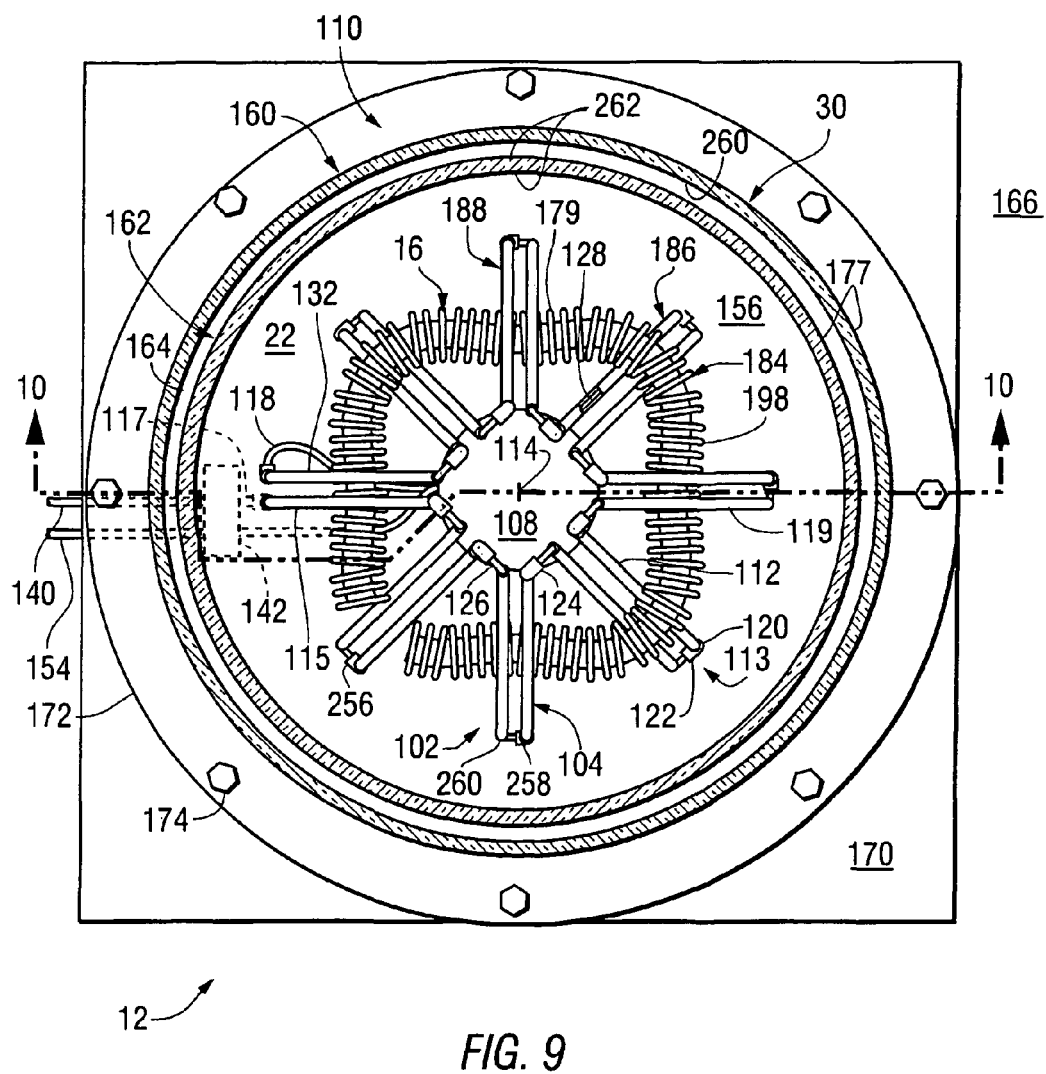
FIG. 9 is a plan view of a solar heat collector within the systems of FIGS. 1, 3, 5, and 6.
Figure 10:
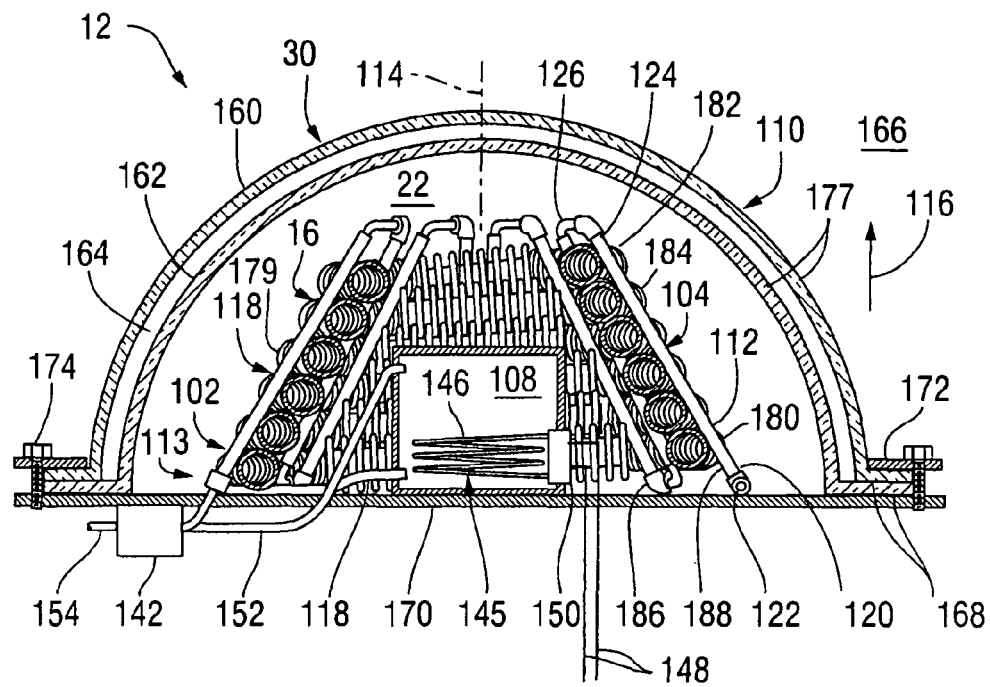
FIG. 10 is a cross-sectional elevation of the solar heat collector of FIG. 9.

An exemplary version of the solar heat collector 12 built in accordance with the present invention will now be discussed with reference being made to FIGS. 9 and 10. FIG. 9 is a plan view of the solar heat collector 12, while FIG. 10 is a cross-sectional elevation thereof, taken as indicated by section lines 10-10 in FIG. 9. The solar heat collector 12 includes a frame 102 having a plurality of legs 104, with the supply conduit 16 being formed as a transverse hose winding around the frame 102 and between the legs 104. In the exemplary version of FIGS. 9 and 10, the solar heat collector 12 is a hybrid system, additionally including a reservoir 108 held within a translucent dome structure 110.

Within the frame 102, each of the legs 104 includes a pair of tubes 112, disposed in a circular pattern 113 around a central axis 114 of the solar heat collector 12 and extending upward, in the direction of arrow 116 and inward, toward the central axis 114. The legs 104 include an inlet/outlet leg 115, in which the tubes 112 are connected to an inlet tube 117 and an intermediate tube 118, and a number of interconnected legs 119. In each of the interconnected legs 119, the tubes 112 are connected at a lower end 120 by connection elements 122. Tubes 112 within adjacent legs 104 are connected at an upper end 124 by connection elements 126, forming a liquid path 128 extending through the frame 102 from the inlet tube 117 to the intermediate tube 118. In this way, various tubular elements may be used both as tubes forming a liquid path 128 and as struts forming the structure of the frame 102. It is understood that the connections between tubes 112 in individual legs 104 may alternately be made at the upper ends 124, with connections between tubes in adjacent legs 104 being made at the lower ends 120.

For example, the liquid path 128 is used to heat water for domestic use, with the inlet tube 117 being connected to an inlet water tube 140 through an anti-scald valve 142, and with the intermediate tube 118 being connected to the reservoir 108. The reservoir 108 includes a heater 145, such as an electrical heating element 146 that is connected to an electrical inlet 148 in response to a thermal switch 150. A reservoir outlet tube 152 from the reservoir 108 is connected to an outlet water tube 154 through the anti-scald valve 142. For example, the thermal valve 150 is set to turn the heating element 146 on when the temperature of water within the reservoir 108 is below 32 deg C (90 deg F), so that hot water can be provided under conditions in which heating by solar radiation alone is insufficient, and additionally so that a space 22 within the translucent dome structure 110 is sufficiently heated by the reservoir 108 to prevent the freezing of water in the water path 128 through the frame 102. The anti-scald valve 142 senses the temperature of water flowing into the outlet water tube 154. When the temperature is below a potentially scalding level, such as, for example, 49 deg C (120 deg F), water flows from the inlet water tube 140 to the inlet tube 132 within the frame 104 and from the reservoir outlet tube 152 to the outlet water tube 154. When this temperature is at or above this potentially scalding level, water from the inlet water tube 140 is mixed with water from the reservoir outlet tube 152 within the anti-scald valve 142, with the resulting mixture being delivered through the water outlet tube 154.

The dome structure 110 includes an outer dome 160 and an inner dome 162, between which an air space 164 is provided to reduce a loss of heat from the airspace 22 to the surrounding atmosphere 166. Each of the domes 160, 162 includes an outward extending flange 168, which is held in place on a floor 170 of the solar heat collector 12 by a clamping ring 172 fastened to the floor 170 with a number of screws 174. The dome structure 110, together with the floor 170, form an example of an exterior structure 18 including at least one translucent portion 30 and surrounding the interior airspace 22.

A central portion 179 of the supply conduit 16 is wound in a continuous, generally spiral, form around the frame 102 from a lower turn 180 to an upper turn 182, with a number of intermediate turns 184 extending therebetween. In FIG. 1, only one of these intermediate turns 184 is shown to provide a clear view of other elements within the solar heat collector 12. The legs 104 of the frame 102 include an equal number of inner frame legs 186 and outer frame legs 188, alternately disposed around the frame 102, with each turn 180, 182, 184 of the supply conduit 16 being alternately disposed outside the inner frame legs 186 and inside the outer frame legs 188. In general, the inner frame legs 186 and the outer frame legs 188 may be disposed outward from the central axis 114 through different distances to provide suitable angles of wrap for the supply conduit 16 around the inner frame legs 186 and the outer frame legs 188. In the example of FIGS. 9 and 10, the outer legs 188 are disposed farther away from the central axis 114 than the inner legs 186.

Figure 11:
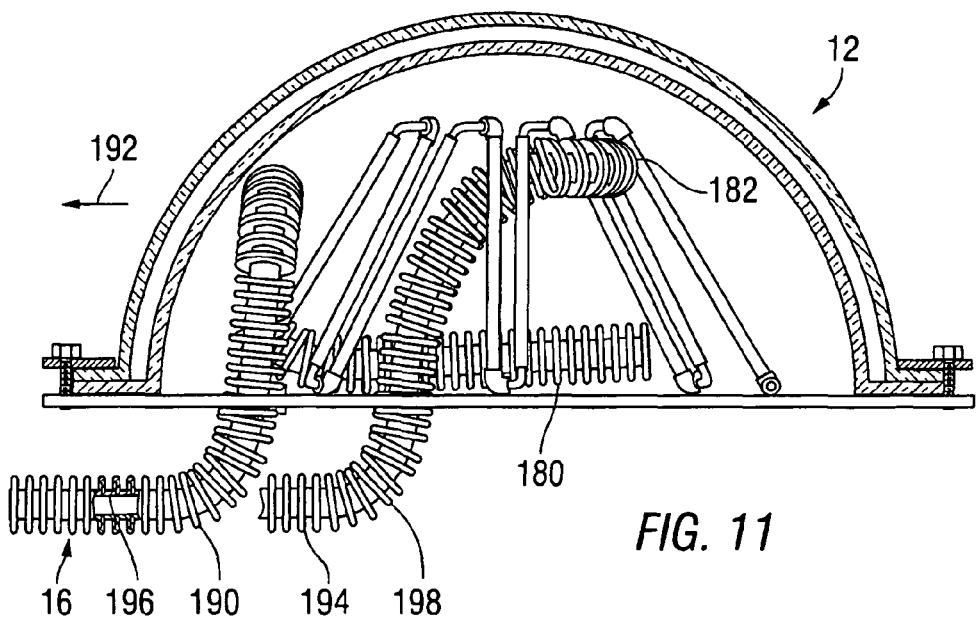
FIG. 11 is a fragmentary elevation of the solar heat collector of FIG. 9, showing a conduit extending outward therefrom.
Figure 12:
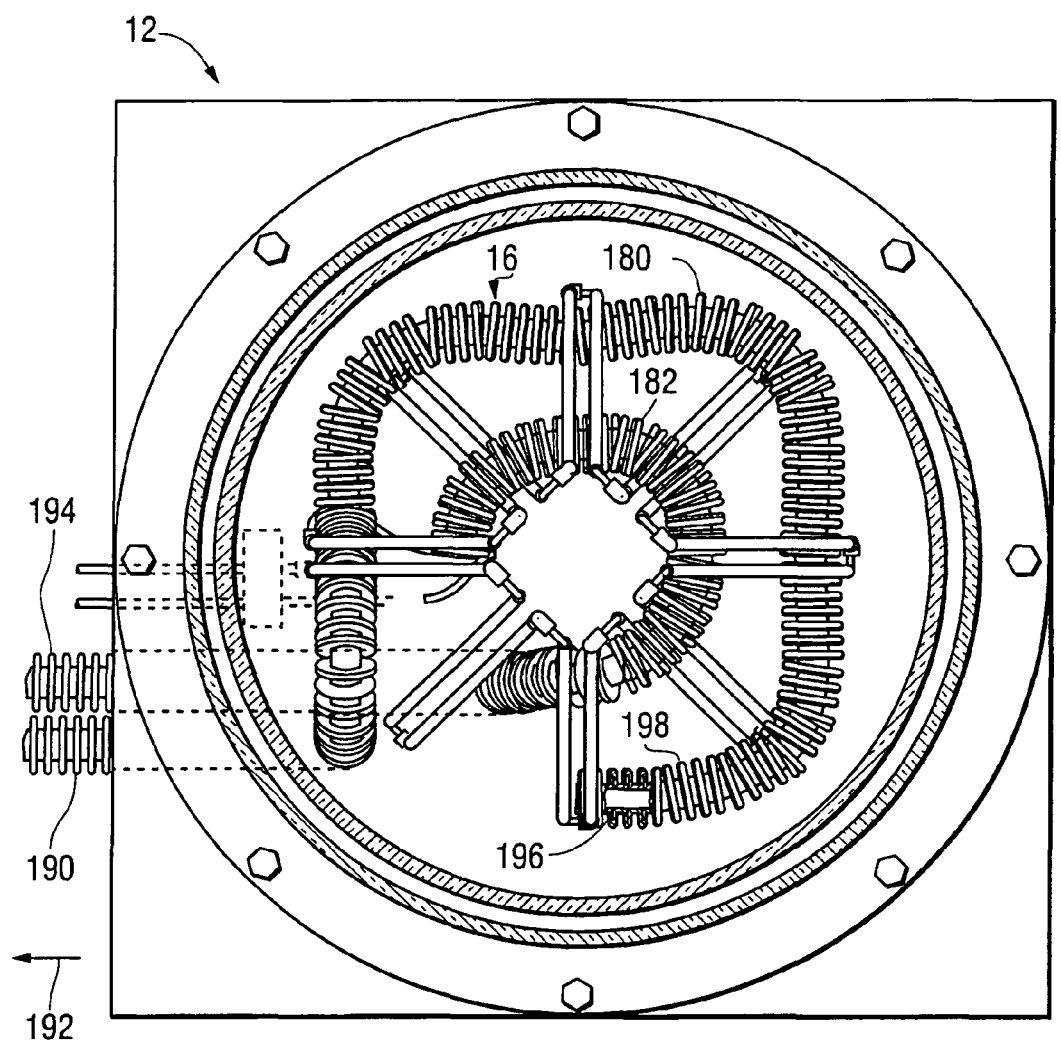
FIG. 12 is a fragmentary plan view of the solar heat collector of FIG. 9, showing a conduit extending outward therefrom.

FIGS. 11 and 12 show portions of the supply conduit 16 extending outward from the solar heat collector 12, with FIG. 11 being a fragmentary elevation, and with FIG. 12 being a fragmentary plan view. In both FIGS. 11 and 12, the translucent dome 110 is shown in cross-section to avoid obscuring the structures being shown. A first connection portion 190 of the supply conduit 16 extends outward, in the direction of arrow 192, from the lower turn 180, while a second connection portion 194 extends outward, additionally in the direction of arrow 192, from the upper turn 182. The supply conduit 16 forms a continuous second fluid path 196, through which a fluid can be pumped in either direction, with either the first connection portion 190 or the second connection portion 194 providing an inlet to the solar heat collector 12 while the other connection portion 190, 194 provides an outlet therefrom.

The supply conduit 16 is composed, for example, of a metal or thermoplastic material having an outwardly extending stiffening structure 198, such as corrugations, bellows, or a helical element extending along the supply conduit 16, which function to allow the conduit 180 to retain its circumferential stiffness (i.e. to remain round while avoiding collapsing) when the supply conduit 16 is bent sharply. The supply conduit 16 may be formed as an integral plastic or metal tubular structure by molding or forming, or as a fabricated structure, such as a structure fabricated from a number of metal parts or a plastic tube attached to extend along a metal helical spring. This type of structure allows the supply conduit 16 to be of a diameter sufficiently large to permit the flow of a gas, such as air, through the supply conduit 16, to be heated directly within the solar heat collector 12 without a need for a separate path through which a liquid is pumped and a heat exchanger to heat the air from the liquid.

Figure 13:
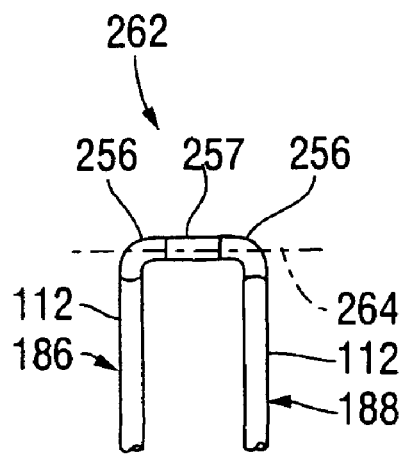
FIG. 13 is a fragmentary elevation of a frame within the solar heat collector of FIG. 9, taken perpendicular to an interconnection axis therein.
Figure 14:
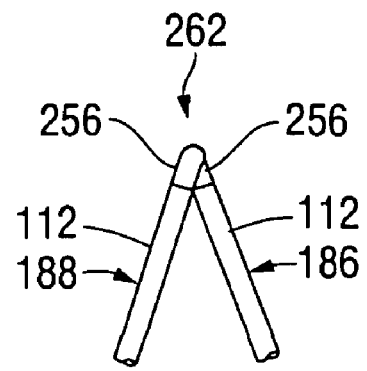
FIG. 14 is a fragmentary elevation of the frame of FIG. 13, taken parallel to the interconnection axis therein.

FIGS. 13 and 14 are fragmentary elevations of the frame 102, showing the connection 262 between a straight tube 112 within an inner frame leg 186 and a straight tube 112 in an adjacent outer frame leg 188. FIG. 13 is taken in a direction perpendicular to an interconnection axis 264, which is generally perpendicular to both the straight tubes 112 in the inner frame leg 186 and the outer frame leg 188. FIG. 14 is taken in a direction which is parallel to the interconnection axis 264. It is noted that a pair of right angle connections 256 are connected to one another, optionally through a straight tube 257, share an interconnection axis 264 about which the connections 256 are connected. Each of the right angle connections 256 is again formed with elbow connections 258 or street connections. In general, the interconnection axis 264 extends at an oblique angle relative to the central axis 114 of the solar heat collector 12.

Figure 15:
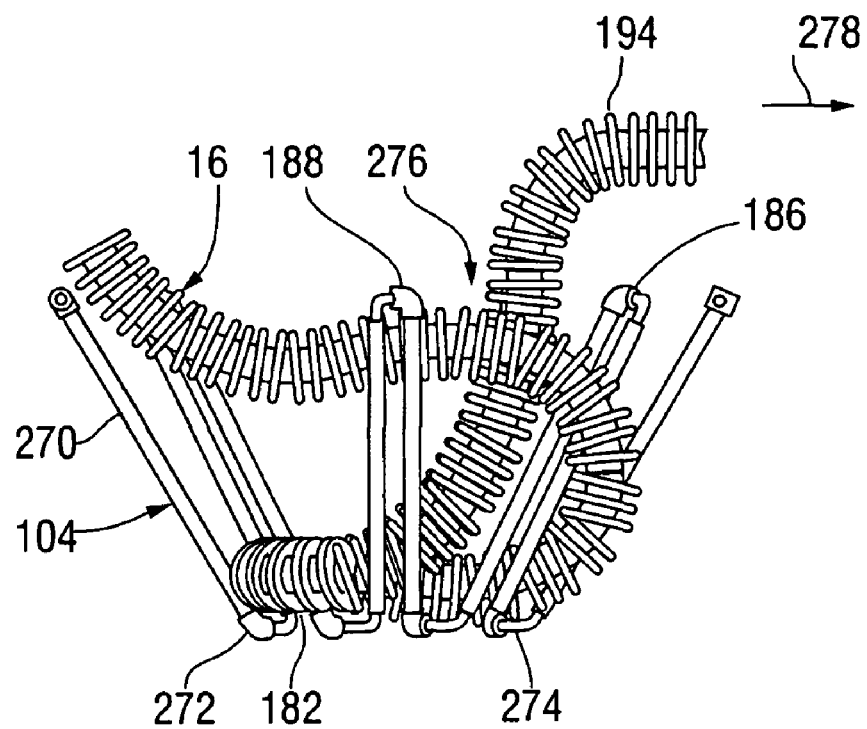
FIG. 15 is an elevation of the solar heat collector of FIG. 9, showing a process of winding the conduit therein around the frame therein.

FIG. 15 is an elevation showing the process of winding the supply conduit 16 around the frame 104, with the frame 104 inverted to upwardly expose openings 270 between adjacent inner frame legs 186 and outer frame legs 188, the process of winding the supply conduit 16 begins with the upper turn 182, having the second connection portion 194 extending outward, in the direction of arrow 278. The supply conduit 16 is wound onto the frame 104 by being moved into the openings 276 to be disposed outside the inner frame legs 186 and inside the outer frame legs 188.

It is understood that the solar heat collector 12 may alternately include a number of panels having frame elements and translucent sheets, formed and assembled as described in U.S. Patent Application Publication No. 2009/0178348 A1, published Jul. 16, 2009, the disclosure of which is incorporated herein by reference. It is further understood that the solar heat collector 12 may include a vacuum system for maintaining a vacuum within a space between translucent panels, as described in U.S. Patent Application Publication No. 2009/0250053 A1, published Oct. 8, 2009, the disclosure of which is additionally incorporated herein by reference.

Figure 16:
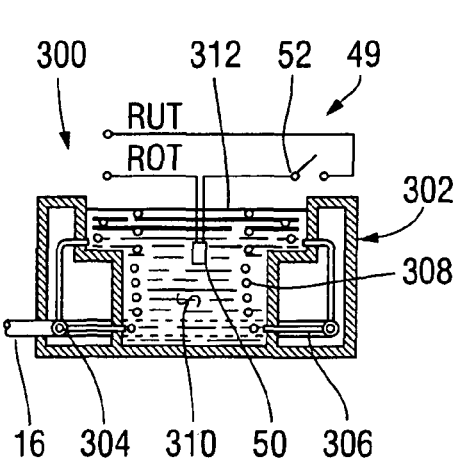
FIG. 16 is a partly-schematic cross-sectional elevation of an example of a heat receiving structure in the system of FIG. 1.

Various exemplary versions of the heat receiving structure 14, discussed above in reference to FIGS. 1, 3, 5, and 6, will now be discussed in reference to FIGS. 16-19. For example, FIG. 16 is a partly-schematic cross-sectional elevation of a heat receiving structure 300 forming an example of the heat receiving structure 14 in FIG. 1. The heat receiving structure 300 includes a pool in the form of a hot tub 302 including an air supply pipe 304 connected to the supply conduit 16 and to a number of ports 306. Heated air from the supply conduit 16 is distributed to form bubbles 308 which rise within the water 310 held in the hot tub 302, heating the water. Since heated air within the bubbles 308 can escape to the atmosphere at the upper surface 312, the vent 32 of FIGS. 1 and 2 is established, with the heat receiving structure 300 forming a part of the system 10 built in accordance with the first embodiment of the invention or of the system 44 built in accordance with the second embodiment of the invention.

Figure 17:
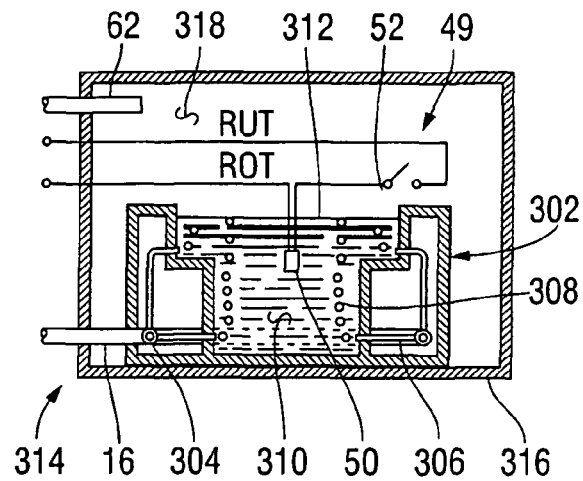
FIG. 17 is a partly-schematic cross-sectional elevation of a first example of a heat receiving structure in the system of FIG. 5.

In the heat receiving structure 314 of FIG. 17, the hot tub 302 is placed within an enclosing structure 316, so that heated air from the bubbles 308 is collected within an enclosed airspace 318 to be returned to the solar collecting structure 12 through the return conduit 62. Thus, the heat receiving structure 314 forms an example of a portion of the system 60 built in accordance with the third embodiment of the invention, shown in FIG. 5, or of the system 68 built in accordance with the fourth embodiment of the invention, shown in FIG. 6.

Figure 18:
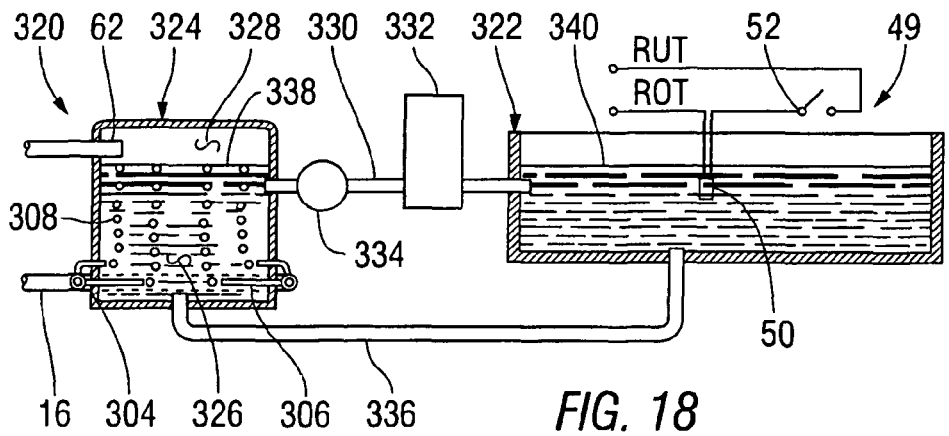
FIG. 18 is a partly-schematic cross-sectional elevation of a second example of a heat receiving structure in the system of FIG. 5.

FIG. 18 is a partly-schematic cross-sectional elevation of a heat receiving structure 320, in which water for a pool 322 is heated within an enclosed tank 324. Again, heated air from the supply conduit 16 is fed through an air supply pipe 304 into air jet tubes 306, with bubbles 308 of heated air rising within water 326 in the enclosed tank 324. Heated air from the bubbles 308 is held in the enclosed tank 324, within airspace 328 above the water 326 and is returned to the solar heat collector 12 through a return conduit 62. Thus, the heat receiving structure 320 forms another example of a portion of the system 60 built in accordance with the third embodiment of the invention, shown in FIG. 5, or of the system 68 built in accordance with the fourth embodiment of the invention, shown in FIG. 6. The water 326 within the enclosed tank 324 is circulated into the pool 322 through of a supply pipe 330 and a filter 332 by means of a pump 334, and is returned from the pool through a return pipe 336. Preferably, the enclosed tank 324 and the swimming pool 322 are arranged so that the water surface 338 of the enclosed tank 324 can be at the level of the water surface 340 within the swimming pool 322. For example, both the enclosed tank 324 and the swimming pool 322 can be located either above ground level or partly below ground level.

In each of the heat receiving structures 300, 314, 320 of FIGS. 16-18, water in a heated pool, e.g. a hot tub or a swimming pool, is heated by bubbles 308 of heated air introduced from the solar heat collector 12. This method has a number of advantages over the conventional method of circulating water from the pool through a solar heat collector. For example, the chemicals used within the pool may corrode the materials carrying water through the solar heat collector, and copper tubing is known to turn the pool water green. Furthermore, in the examples of FIGS. 16 and 17, the heated bubbles can create a Jacuzzi type of environment within the water without a need for a separate air delivery system.

Each of the heat receiving structures 300, 314, 320 includes a switching circuit 49, operating as described above in reference to FIG. 3, with a temperature sensor 50 measuring a temperature within the water of the heated pool. When a switch 52 is manually operated, with a water temperature below a predetermined minimum, the receiver under temperature signal RUT is turned on so that heated air is moved into the heat receiving structure 300, 314, 320. For example, the temperature sensor 50 may produce the receiver over temperature signal ROT when the water temperature is over 40 deg C (104 deg. F).

Figure 19:
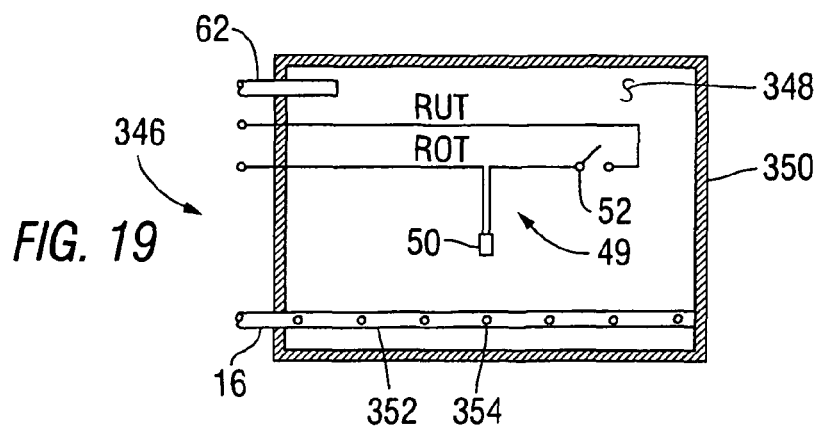
FIG. 19 is a partly-schematic cross-sectional elevation of a third example of a heat receiving structure in the system of FIG. 5.

FIG. 19 is a partly-schematic cross-sectional elevation of a heat receiving structure 346 for heating an airspace 348 within an enclosing structure 350, such as a house or cabin, which may have internal walls (not shown). The supply conduit 16 is connected to a duct 352 carrying heated air into the airspace 348 through a number of outlets 354. Air from the airspace 348 is returned to the solar heat collector 12 through the return conduit 62. For example, the temperature sensing device 50 is set to provide the RUT signal when a measured temperature is below a temperature to which the airspace 348 should be heated and to provide the ROT signal when the measured temperature is above the hottest temperature at which the enclosing structure 350 can be comfortably occupied.

Each of the RUT and ROT signals generated within the heat receiving structures 300, 314, 320, 346, 360 is applied within a system as described above in reference to FIGS. 1-8.

Figure 20:
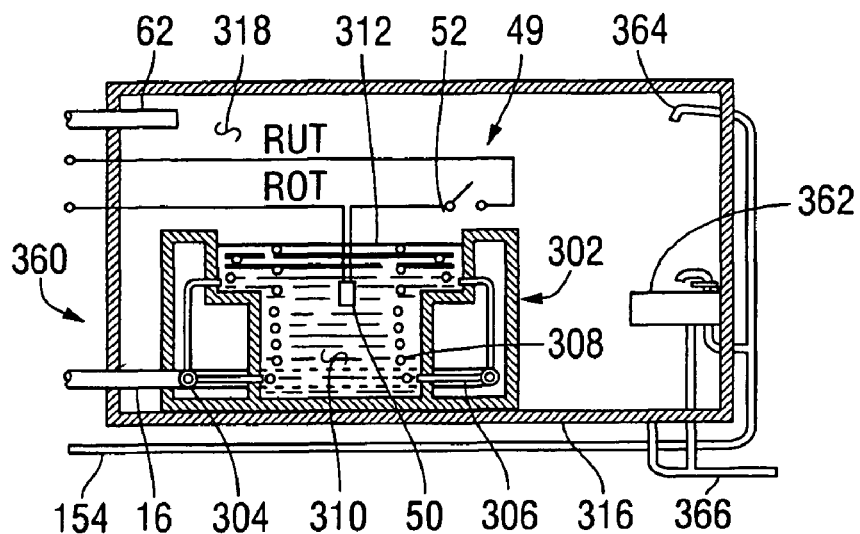
FIG. 20 is a partly schematic cross-sectional elevation of the heat receiving structure of FIG. 17 with additional provisions for providing heated water.

The version of the solar heat collector 12 described above in reference to FIGS. 9 and 10 includes an optional liquid path 128 that can be used to heat water for domestic use, with heated water being provided through an outlet water tube 154 from an anti-scald valve 142. This provision for heating water for domestic use may be applied within various systems and versions of the heat receiving structure 14 as described above in reference to FIGS. 16-19. For example, FIG. 20 is a partly-schematic cross-sectional view of a heat receiving structure 360 including the hot tub 302, as described above in reference to FIG. 16, and additionally including a sink 362 and a shower head 364, shown as examples of heated water receiving structures 365, for which water is provided from the outlet water tube 154. After use, this water is drained through a drain line 366.

Figure 21:
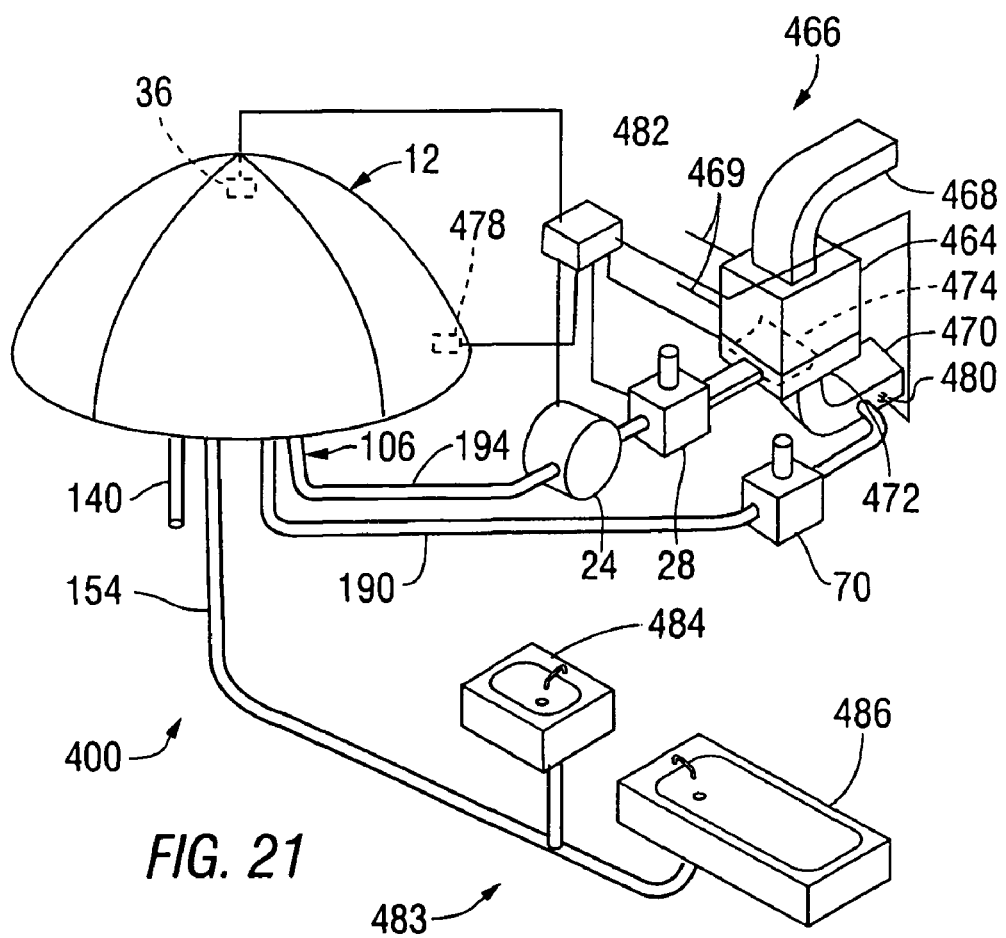
FIG. 21 is a partly-schematic cross-sectional elevation of an example of the system of FIG. 5, with additional provisions for providing heated water.

The solar heat collector 12 can also be used within a hybrid system, in which heated air from the supply conduit 16 is mixed with air heated by another source, such as electricity. For example, in an exemplary hybrid system 400, shown in FIG. 21, the supply conduit 16 is connected to an air conditioning system 466, so that a portion of the air circulating through the air conditioning system 466 can be heated in the solar heat collector 12 within the supply conduit 16. The air conditioning system 466 includes a supply duct 468 supplying heated air from an air handling unit 464 within a structure and a return duct 470 returning air from within the structure to the air handling unit 464. A conventional heating system is provided for warming air moving through the air conditioning system 466, using, for example, a refrigerant moving through a line 469 including coils (not shown) within the air handling unit 464, with the refrigerant being heated by a reverse-cycle air conditioning compressor (not shown).

In the hybrid system 400, air is circulated through the supply conduit 16 by the air pump 24 into a plenum 472, with a return conduit 62 receiving air from the return duct 470. For example, a curved plate 474 within the plenum 472 deflects air from the air pump 24 into the air handling unit 464. Preferably, the solar heat collector 12 additionally includes a first thermal sensor 478, sensing a temperature within the supply conduit 16, while the air conditioning system 466 includes a temperature sensor 480, sensing a temperature within the return duct 470. Output signals from these sensors 478, 480 are provided as inputs to a control system 482, which then, for example, operates the air pump 24 so that air is moved into the plenum 472 from the supply conduit 16 only when the air within the supply conduit 16 is warm enough to heat the air being delivered through the return duct 470.

The exemplary hybrid system 400 also includes elements providing for operation in accordance with the fourth embodiment of the present invention, as described above in reference to FIG. 6. The supply conduit 16 is provided with a bypass valve 46, and the return conduit 62 is provided with an input valve 70. For example, the temperature sensor 480 is used to provide the ROT and RUT signals to the control system 482, while an additional temperature sensor 36 within the solar heat collector 12 provides the COT signal. The control system 482 operates the bypass valve 46 and the input valve 70 as described above in reference to FIGS. 6-8 and causes a fan (not shown) within the air handling unit 464 to be turned on when air is being moved into the air handling unit 464 to cool the solar heat collector 12. The outlet tube 154 from the solar heat collector 12 is additionally used to provide heated water for domestic use, extending, for example, to heated water receiving structures 483, such as a sink 484 and to a tub 486.

The over-temperature protection for the solar heat collector 12, as described above, makes it possible to use various materials, such as thermoplastics for transparent or translucent domes or panels, within the solar heat collector 12, which could not be used if the materials were exposed to over-temperature conditions. The various systems heating water for use in a pool, whether a hot tub or a swimming pool, have advantages of not requiring water from the pool to be moved through the piping of the system. In addition, a Jacuzzi type of bubble movement is achieved.

While the invention has been described in its preferred embodiments with some degree of particularity, it is understood that this description has been given only by of example, and that many variations can be made without departing from the spirit and scope of the invention, as defined within the appended claims.

What is claimed is:

1. A system comprising:
   a solar heat collector including a partly translucent structure surrounding an airspace;
   a heat receiving structure;
   a supply conduit forming an air path extending through the airspace within the solar heat collector, between the solar heat collector and the heat receiving structure, and into the heat receiving structure;
   a first temperature sensor producing a collector over temperature signal when a temperature within the airspace, external to the supply conduit; exceeds a predetermined level;
   an air pump blowing air through the supply conduit;
   a control circuit turning the air pump on in response to the collector over temperature signal;

a switching circuit having a second temperature sensor, producing a receiver under temperature signal as an input to the control circuit in response to measuring a temperature within the heat receiving structure at a level below a predetermined minimum, wherein the control circuit additionally turns the air pump on in response to the receiver under temperature signal, and wherein the second temperature sensor additionally produces a receiver over temperature signal as an input to the control circuit in response predetermined maximum level, a bypass valve within the supply conduit between the solar heat collector and the heat receiving structure, wherein the bypass valve is movable between a first condition, in which air from the solar heat collector moves through the bypass valve into the heat receiving structure, and a second condition, in which air from the solar heat collector moving through the bypass valve is exhausted into air outside the solar heat collector and the heat receiving structure through an exhaust port of the bypass valve, wherein the control circuit causes the bypass valve to be held in the first condition while receiving the receiver under temperature signal, and wherein the control circuit causes the bypass valve to be held in the second condition while receiving the collector over temperature signal without the receiver under temperature signal, and wherein the control circuit additionally causes the bypass valve to operate in response to the receiver over temperature signal; and a return conduit returning air from the heat receiving structure to the supply conduit within the solar heat collector.

2. The system of claim 1, additionally comprising a third temperature sensor measuring an air temperature outside the solar heat collector and outside the heat receiving structure, producing an ambient air under temperature signal when the air temperature outside the solar heat collector and outside the heat receiving structure, wherein the control circuit additionally causes the bypass valve to operate in response to the ambient air under temperature signal.

3. The system of claim 1, wherein
the heat receiving structure includes a pool;
the air blown through the supply conduit forms bubbles of heated air within a first portion of water in the heat receiving structure,
at least part of the water in the heat receiving structure is in the pool;
an enclosing structure enclosing the first portion of water and an airspace above the first portion of water; and
the return conduit returns air from the airspace above the first portion of water.

4. The system of claim 3, wherein the supply conduit is connected to at least one port extending into the pool to form the bubbles of heated air within the pool, and wherein the enclosing structure encloses the pool and an airspace above the pool.

5. The system of claim 3, wherein
the enclosing structure is formed by an enclosed tank holding water, having an airspace above the water in the enclosed tank and having at least one port extending into the water, and
the supply conduit is connected to the at least one port in the enclosed tank to form bubbles of heated air within the enclosed tank.

6. A system comprising:
a solar heat collector including a partly translucent structure surrounding an airspace;
a heat receiving structure;
a supply conduit forming an air path extending through the airspace within the solar heat collector, between the solar heat collector and the heat receiving structure, and into the heat receiving structure;
a first temperature sensor producing a collector over temperature signal when a temperature within the airspace, external to the supply conduit; exceeds a predetermined level;
an air pump blowing air through the supply conduit;
a control circuit turning the air pump on in response to the collector over temperature signal;
a switching circuit having a second temperature sensor, producing a receiver under temperature signal as an input to the control circuit in response to measuring a temperature within the heat receiving structure at a level below a predetermined minimum, wherein the control circuit additionally turns the air pump on in response to the receiver under temperature signal;
a bypass valve within the supply conduit between the solar heat collector and the heat receiving structure, wherein the bypass valve is movable between a first condition, in which air from the solar heat collector moves through the bypass valve into the heat receiving structure, and a second condition, in which air from the solar heat collector moving through the bypass valve is exhausted into air outside the solar heat collector and the heat receiving structure through an exhaust port of the bypass valve, wherein the control circuit causes the bypass valve to be held in the first condition while receiving the receiver under temperature signal, and wherein the control circuit causes the bypass valve to be held in the second condition while receiving the collector over temperature signal without the receiver under temperature signal;
a return conduit returning air from the heat receiving structure to the supply conduit within the solar heat collector; and
an input valve connecting the return conduit to the supply conduit within the solar heat collector, wherein the control circuit additionally moves the input valve between a first condition, in which air is drawn into the supply conduit within the solar heat collector from the return conduit, and a second condition, in which air is drawn into the supply conduit within the solar heat collector from air outside the solar heat collector and outside the heat receiving structure.

7. The system of claim 6, additionally comprising a third temperature sensor measuring an air temperature outside the solar heat collector and outside the heat receiving structure, producing an ambient air under temperature signal when the air temperature is below a predetermined minimum level, wherein the control circuit additionally causes the bypass valve and the input valve to operate in response to the ambient air under temperature signal.

8. The system of claim 6, wherein
the heat receiving structure comprises a pool containing water, at least one port within the water, and an enclosing structure enclosing the pool and having an airspace above the pool,
the supply conduit is connected to the at least one port within the water,
air flowing through the supply conduit forms bubbles within the water at the at least one port,
the bubbles heat the water within the pool and rise to exhaust heated air into the airspace within the heat receiving structure,
the return conduit is connected to the airspace within the heat receiving structure to return air from the airspace within the heat receiving structure to the supply conduit within the solar heat collector.

9. The system of claim 6, wherein
the heat receiving structure includes an enclosing structure enclosing an airspace and a duct, including a number of outlets, extending into the airspace enclosed by the enclosing structure,
the supply conduit is connected to the duct to carry heated air into the airspace enclosed by the enclosing structure through the outlets of the duct, and
the return conduit is connected to the airspace within the enclosing structure to return air from the airspace within the enclosing structure to the supply conduit within the solar heat collector.

10. A system comprising:
a solar heat collector including a partly translucent structure surrounding an airspace;
a heat receiving structure comprising a pool containing water, an enclosed tank containing water having an airspace above the water within the enclosed tank, at least one port within the water within the enclosed tank, and piping having a pump circulating water between the pool and the enclosed tank;
a supply conduit forming an air path extending through the airspace within the solar heat collector, between the solar heat collector and the heat receiving structure, and into the heat receiving structure, wherein the supply conduit is connected to the at least one port within the water, wherein air flowing through the supply conduit forms bubbles within the water at the at least one port, and wherein the bubbles heat the water within the enclosed tank and rise to exhaust heated air into the airspace within the heat receiving structure;
a return conduit connected to the airspace within the enclosed tank to return air from the airspace within the enclosed tank to the supply conduit within the solar heat collector;
a first temperature sensor producing a collector over temperature signal when a temperature within the airspace, external to the supply conduit; exceeds a predetermined level;
an air pump blowing air through the supply conduit;
a control circuit turning the air pump on in response to the collector over temperature signal;
a switching circuit having a second temperature sensor, producing a receiver under temperature signal as an input to the control circuit in response to measuring a temperature within the heat receiving structure at a level below a predetermined minimum, wherein the control circuit additionally turns the air pump on in response to the receiver under temperature signal; and
a bypass valve within the supply conduit between the solar heat collector and the heat receiving structure, wherein the bypass valve is movable between a first condition, in which air from the solar heat collector moves through the bypass valve into the heat receiving structure, and a second condition, in which air from the solar heat collector moving through the bypass valve is exhausted into air outside the solar heat collector and the heat receiving structure through an exhaust port of the bypass valve, wherein the control circuit causes the bypass valve to be held in the first condition while receiving the receiver under temperature signal, and wherein the control circuit causes the bypass valve to be held in the second condition while receiving the collector over temperature signal without the receiver under temperature signal.

11. A system comprising:
a solar heat collector including a partly translucent structure surrounding an airspace, wherein the solar heat collector additionally includes a liquid path connected to a water supply, heating water for domestic use;
a heat receiving structure, including at least one heated water receiving structure connected to the liquid path within the solar heat collector through an outlet water tube;
an anti-scald valve, wherein an input end of the liquid path within the solar heat collector is connected to the water source through the anti-scald valve, wherein an output end of the liquid path within the solar heat collector is connected to the outlet water tube through the anti-scald valve, wherein when the temperature of water moving into the outlet water tube is below a predetermined level, all of the water moving into the outlet water tube is from the output end of the liquid path within the solar heat collector, and wherein when the temperature of water moving into the outlet water tube moves above the predetermined level, the anti-scald valve operates to admit water from the water source into the outlet water tube;
a supply conduit forming an air path extending through the airspace within the solar heat collector, between the solar heat collector and the heat receiving structure, and into the heat receiving structure;
a first temperature sensor producing a collector over temperature signal when a temperature within the airspace, external to the supply conduit; exceeds a predetermined level;
an air pump blowing air through the supply conduit;
a control circuit turning the air pump on in response to the collector over temperature signal;
a switching circuit having a second temperature sensor, producing a receiver under temperature signal as an input to the control circuit in response to measuring a temperature within the heat receiving structure at a level below a predetermined minimum, wherein the control circuit additionally turns the air pump on in response to the receiver under temperature signal;
a bypass valve within the supply conduit between the solar heat collector and the heat receiving structure, wherein the bypass valve is movable between a first condition, in which air from the solar heat collector moves through the bypass valve into the heat receiving structure, and a second condition, in which air from the solar heat collector moving through the bypass valve is exhausted into air outside the solar heat collector and the heat receiving structure through an exhaust port of the bypass valve, wherein the control circuit causes the bypass valve to be held in the first condition while receiving the receiver under temperature signal, and wherein the control circuit causes the bypass valve to be held in the second condition while receiving the collector over temperature signal without the receiver under temperature signal; and
a return conduit returning air from the heat receiving structure to the supply conduit within the solar heat collector.

* * * * *